United States Patent [19]
Yamamoto et al.

[11] Patent Number: 5,481,491
[45] Date of Patent: Jan. 2, 1996

[54] RECORDING MEDIUM, RECORDING METHOD, AND READOUT METHOD

[75] Inventors: Keisuke Yamamoto; Fumio Kishi, both of Atsugi; Taiko Motoi, Sagamihara; Takehiko Kawasaki; Norio Kaneko, both of Atsugi, all of Japan

[73] Assignee: Canon Kabushiki Kaisha, Tokyo, Japan

[21] Appl. No.: 82,149

[22] Filed: Jun. 28, 1993

Related U.S. Application Data

[62] Division of Ser. No. 634,707, Dec. 27, 1990, Pat. No. 5,289,402.

[30] Foreign Application Priority Data

Dec. 29, 1989 [JP] Japan ................... 1-341814

[51] Int. Cl.$^6$ ................................................. G11C 13/00
[52] U.S. Cl. ................................................. 365/148; 365/244
[58] Field of Search ................................. 365/148, 174, 365/189.01, 230.01, 244

[56] References Cited

U.S. PATENT DOCUMENTS

| | | | |
|---|---|---|---|
| 3,324,531 | 6/1967 | Hiatt | 29/155.5 |
| 3,440,588 | 4/1969 | Drake et al. | 338/20 |

FOREIGN PATENT DOCUMENTS

| | | |
|---|---|---|
| 275881 | 7/1988 | European Pat. Off. . |
| 0299879 | 1/1989 | European Pat. Off. . |
| 493435 | 1/1974 | Japan . |

OTHER PUBLICATIONS

Patent Abstracts of Japan, vol. 7, No. 87 (Apr. 12, 1983), Japanese Laid Open No. 58-12151.
Binnig, et al., Helvetical Physica Acta, vol. 55, No. 726, "Scanning Tunneling Microscopy", pp. 726–735 (1982).
Staufer, et al., Applied Physics Letters, vol. 51, No. 4, "Nanometer Scale Structure Fabrication with the Scanning Tunneling Microscope", pp. 244–246 (Jul. 27, 1987).

*Primary Examiner*—Terrell W. Fears
*Attorney, Agent, or Firm*—Fitzpatrick, Cella, Harper & Scinto

[57] ABSTRACT

A recording medium comprises an electroconductive oxide film held between a substrate and an insulating oxide film. A recording method locally applies a voltage onto the medium to form a portion different in electric resistance or oxygen content in the electroconductive oxide film. A record-readout method comprises the steps of applying a voltage to the electroconductive oxide film having information recorded thereon and detecting the intensity of current flowing through a recorded portion to read out the recorded information.

19 Claims, 4 Drawing Sheets

RECORDING MEDIUM, RECORDING METHOD, AND READOUT METHOD

This application is a division of application Ser. No. 07/634,707, filed Dec. 27, 1990 now U.S. Pat. No. 5,289,402.

BACKGROUND OF THE INVENTION

1. Field of the Invention

The present invention relates to a recording medium which is suitable for recording in high density with a large recording capacity, and yet allows rewriting. The present invention also relates to a recording method and a record-readout method employing the recording medium.

2. Related Background Art

In recent years, applications of memory materials are the most important in electronic industries such as computers and related apparatuses, video discs, and digital audio discs. The research and development of the memory materials are extensively being conducted.

The performances required for memory materials depend on the application field thereof. Generally, high density and large recording capacity are desired.

Heretofore, semiconductor memory materials and magnetic memory materials employing a semiconductor of a magnetic substance have mainly been used for the recording mediums. Recently, however, as the results of progress in laser technique, inexpensive and high-density recording mediums utilizing optical memory materials have come to be practical which employ an organic thin film such as of an organic pigment, and a photopolymer, and the like.

The optical memory makes feasible high density recording and readout at a µm level by utilizing recesses and projection of the surface, or difference in reflectivity of the surface of the recording medium. Such recording mediums utilize a thin film of a metal or a metal compound, a thin film of an organic pigment, or the like, on which information is recorded by boring holes or changing the reflectivity by evaporation or fusion by means of heat of laser beams. In these methods, the recording density depends on the spot diameter of the laser beam employed.

At the moment, however, with rapid advance of processing images as information, high-density and large-capacity memory by a smaller size of the apparatus is desired to be developed.

Recently, scanning tunnel microscopy (hereinafter referred to as "STM") has been developed, which makes it feasible to observe directly the electronic structure of atoms on the surface of conductors [G. Binning et al., Helvetica Physica Acta, 55 726 (1982)]. By the STM, a real spatial image, whether of a single crystal or of an amorphous matter, can be measured advantageously without impairing the medium by electric current and with low electric power. Further the STM observation may be conducted in an atmospheric environment and may be done for various materials. Therefore the STM is promising for a variety of application fields.

The STM utilizes tunnel current which flows when a metal probe and an electroconductive substance under application of an electric voltage therebetween are brought close to about 1 nm. This tunnel current is extremely sensitive to the change of the distance between the two. Therefore the scanning with the probe by keeping the tunnel current constant can represent the real spatial surface structure of a material, and can simultaneously give various information regarding the entire electron cloud of the surface atoms.

The analysis by the STM has been applicable only to electroconductive samples. However, the STM has recently come to be employed for analysis of structure of monomolecular films formed extremely thin on the surface of an electroconductive material. Therefore the STM is expected to be useful as a reproduction technique in high-density record by utilizing the difference of states of individual organic molecules.

The application of STM to recording and reproduction technique includes a method in which recording is conducted by changing the surface state of a recording medium by use of electron beam, ion beam, or electromagnetic wave such as X ray and light, and the record is reproduced by STM; and a method in which recording and reproduction are conducted by means of STM by use of a recording medium exhibiting memory effect in voltage current characteristics, such as a thin film of a chalcogenated substance and a thin film of a π-electronic organic compound.

Further, a trial is made to form cone-like projections on the surface of an Rh-Zr alloy sample by local fusion by application of field-emission voltage to a probe electrode of STM. [U. Staler et al., Appl. Phys. Lett., 51 (4) 27 July 1987]

Electrostatic recording methods, in which a latent image is formed by electric discharge or electric current flow by use of a needle-shaped electrode are well known, and are applied in various ways to recording on mediums such as recording paper (Japanese Patent Application Laid-open No. 49-3435).

The thin film employed in such electrostatic recording mediums has a thickness of a µm level. No report is found on electrostatic readout and reproduction of the latent image on the recording medium.

SUMMARY OF THE INVENTION

An object of the present invention is to provide a recording medium which is suitable for recording in high density with a large recording capacity, and yet allows rewriting, and a recording method and record-readout method utilizing the recording medium.

Another object of the present invention is to provide a recording medium which is resistant to a magnetic field and change in environmental temperature, and is superior in record-storage stability.

A further object of the present invention is to provide a recording medium which allows direct electrical readout, and a recording method and a record-readout method employing the recording medium.

All the above objects are achieved by the present invention.

According to an aspect of the present invention, there is provided a recording medium, comprising an electroconductive oxide film held between a substrate and an insulating oxide film.

According to another aspect of the present invention, there is provided a recording method, comprising the step of applying locally a voltage onto a recording medium having an electroconductive oxide film held between a substrate and an insulating oxide film to form a portion having different electric resistance in the electroconductive oxide film.

According to still another aspect of the present invention, there is provided a recording method, comprising the step of applying locally a voltage onto a recording medium having an electroconductive oxide film held between a substrate and an insulating oxide film to form a portion having a different oxygen content in the electroconductive oxide film.

According to a further aspect of the present invention, there is provided a record-readout method, comprising the steps of applying a voltage to an electroconductive oxide film held between a substrate and an insulating oxide film and having information recorded thereon, and detecting the intensity of current flowing through a recorded portion to read out the recorded information.

DETAILED DESCRIPTION OF THE PREFERRED EMBODIMENT

Figure 1:
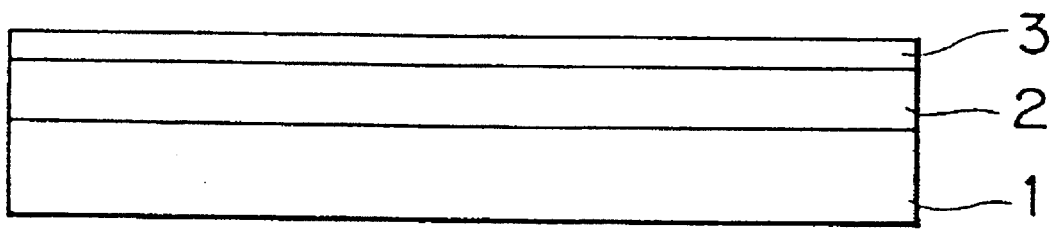
FIG. 1, FIG. 2, and FIG. 3 illustrate roughly the constitution of the present invention (cross-sectional views).

The present invention is characterized primarily by a novel recording medium comprising an electroconductive oxide film as a recording layer, and an insulating oxide film which covers the active surface (the recording surface) of the electroconductive oxide film.

Viewed in the utilization of oxygen ion as the medium, an oxidation-reduction reaction is analogous in principle to one of the features of the present recording medium. A typical phenomenon based on reversible change of state in an oxidation-reduction reaction is electrochromism. The electrochromism is a phenomenon of coloration of one or both of electron-transferring substances by an electrochemical oxidation-reduction reaction, and is being applied to displaying elements.

The materials for utilizing the phenomenon are known to be formed by a compound of nickel or tungsten. The coloration is understood to be caused by the change of the valence number of the metal ion, leading to change of electronic state, thereby appearing or shifting an absorption peak in the visible region.

Being different in principle from the above electrochromism, the present invention is not based on an oxidation-reduction reaction in the recording medium having the above constitution, but is based on the migration of oxygen ions in a solid (namely, in the electroconductive oxide film) to record information.

More specifically, electroconductive oxide materials are known to transform electrically among metal, semiconductor, and insulating material in accordance with the state of oxygen deficiency in the crystal lattice. Further, the surface of an electroconductive oxide material is extremely active, and therein the oxygen ions moves very actively. The present invention utilizes this active layer by coating it with an insulating oxide material to prevent diffusion of the oxygen to outside (out of the recording medium) and to facilitate the migration of the oxygen ion within the recording medium.

Consequently, a memorizing ability is found to be brought about based on a completely novel principle, in which application of a certain threshold voltage exhibits an electric memory effect of giving two states of high resistance and low resistance before and after the voltage application. This is considered to be caused by formation of a temporary state of oxygen deficiency in the interior of the active layer at the surface of the electroconductive oxide layer as the result of oxygen ion migration, bringing reversible electrical states of high resistance and low resistance.

The present invention employs a recording medium based on the novel principle, using at least one probe electrode for the one polarity, bringing the probe electrode extremely close (about 1 nm) to the medium and applying voltage by use of STM to limit the region of the oxygen ion migration, causing oxygen ion migration in a very limited region, and thereby forming reversible states of high resistance and low resistance and achieving high-density recording.

Further, for discrimination of the regions having different quantity of oxygen ions, STM can be used which is extremely sensitive to resistance change to enable high-density readout and reproduction, and still further direct electrical detection of recorded information, which is another characteristic of the present invention.

Specifically, the detection is made by change of the tunnel current flowing between the probe electrode and the counter electrode, while the detection may also be made by the control signal given on controlling the distance between the probe electrode and the recording medium so as to maintain the tunnel current constant.

The response speed is a weak point of the conventional electrochromism, and the speed is determined by the speed of the diffusion of the oxygen atoms or molecules by the oxidation-reduction reaction. On the contrary, the present invention is based on the migration of oxygen ions which is irrelevant to the above diffusion, so that the response speed is extremely high in the present invention.

The present invention is described in more detail by referring to preferable embodiment thereof.

Firstly, the recording medium of the present invention is described in detail.

FIG. 1 shows a rough illustration of the constitution of a recording medium of the present invention. On a substrate 1, a layer 2 as an electroconductive oxide film is laminated. Further, an insulating oxide film 3 is laminated on the electroconductive oxide layer 2, Thus the recording medium of the present invention has basically a constitution such that an electroconductive oxide film 2 is sandwiched between a substrate 1 and an insulating oxide film 3.

In the present invention, the substrate which supports the thin films of the electroconductive oxide material and the insulating oxide material may be any of metals, glass, ceramics, plastics, and the like.

The substrate is preferably in a shape of a plate, but is not limited thereto and may be in any shape. The film can be formed in conformity with a surface shape of any substrate if the film-forming method is appropriate.

In the present invention, the aforementioned electroconductive oxide material serves as the recording layer, which is based on the characteristic that the electroconductive oxide material changes its electroconductivity depending on the electron deficiency thereof. Accordingly, it is preferable to use a selected material which changes the above electroconductivity in greater degree in view of the effect of the present invention. In this respect, the preferable materials include oxide materials such as ITO, $IrO_2$, $WO_3$, $CaWO_4$, $InO_2$, and $MnO_2$, and oxide materials of Y-Ba-Cu-O type, Bi-Sr-Ca-Cu-O type, Tl-Ba-Ca-Cu-O type, and the like. Among the above-mentioned materials, from the standpoint of the possibility of larger contrast between recorded portions and non-recorded portions and the stability of the contrast state, particularly preferred are $Y_1Ba_xCu_yO_z$ in the composition range of x of 2–4, and y of 3–8 from among the Y-Ba-Cu-O type; $Bi_2Sr_2Ca_xCu_yO_z$ in the composition range of x of 0–2 and y of 1–3 from among the Bi-Sr-Ca-Cu-O type; $Tl_1Ba_2Ca_xCu_yO_z$ in the composition range of x of 0–5 and y of 1–6, and $Tl_2Ba_2Ca_xCu_yO_z$ in the composition range of x of 0–5 and y of 1–6 from among the Tl-Ba-Ca-Cu-O type. The specific examples of particularly preferred material in the above materials include $YBa_2Cu_3O_y$, $YBa_2Cu_4O_y$, $Y_2Ba_4Cu_7O_y$, and $YBa_3Cu_6O_y$ in the Y-Ba-Cu-O type; $Bi_2Sr_2Cu_3O_y$, $Bi_2Sr_2CaCu_2O_y$, and $Bi_2Sr_2Ca_2Cu_3O_y$ in the Bi-Sr-Ca-Cu-O type; and $TlBa_2Ca_nCu_{n+1}O_y$ (n=0–5), and $Tl_2Ba_2Ca_nCu_{n+1}O_y$ (n=0–5) in the Tl-Ba-Ca-Cu-O type. Some of the above materials are known as high-temperature superconductive substances. However the material for the recording layer in the present invention need not have superconductivity at all.

The electroconductive oxide film in the present invention has preferably a thickness within the range of from 1000Å to 1 μm, particularly preferably from 1000Å to 3000Å.

The electroconductive oxide film in the present invention needs to be covered at its active surface (namely, a recording face) with an insulating oxide film. This is because the recording process in the present invention is based on migration of oxygen ions within the recording medium which requires prevention of migration (or diffusion) of oxygen ions to the outside of the recording medium. In this respect, the use of the insulating oxide film is effective for the material for the coating layer formed on the electroconductive oxide film. The insulating oxide film functions as an oxygen-interception film. The particularly preferred material has electro-conductivity of not higher than $10^{-4}$ $(\Omega\cdot cm)^{-1}$ more preferably not higher than $10^{-11}$ $(\Omega\cdot cm)^{-1}$. The examples of the particularly preferred insulating oxide materials include many materials such as $SiO_2$, $TiO_2$, MgO, $SrTiO_3$, BaO, $Y_2O_3$, $BaTiO_3$, ZnO, and the like.

In order to achieve further greater effect in the above-mentioned function, an insulating material is used which has an electroconductivity of lower by one or mope decimals than that of the employed electroconductive material, or in other words, being lower by one or more orders of magnitude over that. That is, the insulating material has an electroconductivity lower than that of the employed electroconductive material by at least 10 $(\Omega\cdot cm)^{-1}$. By the same reason, namely by the reason that the insulting oxide material is required to serve for prevention of diffusion of the oxygen ions and for pinning of the migrated oxygen ions, the insulating oxide film is preferably thin, such as 1000Å or less, or more preferably from 50 to 200Å in thickness to achieve the above effect.

Figure 2:
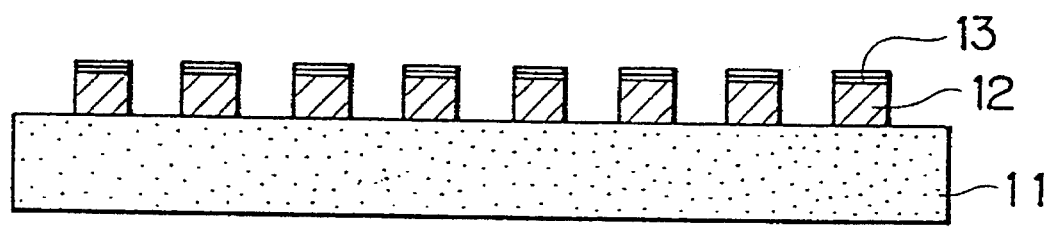
Figure 3:
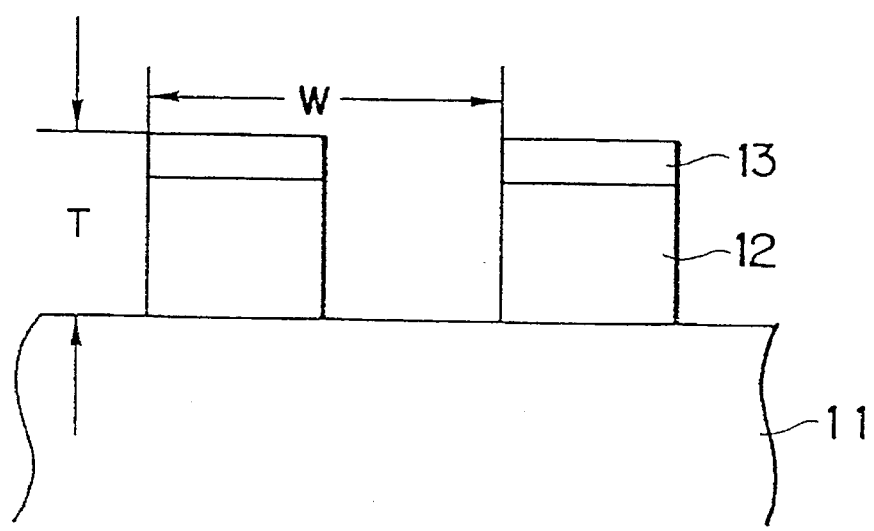

The recording medium of the present invention may be of the constitution as illustrated by FIG. 2. In other words, recording mediums having an indented surface (recording face) are also included in the present invention. In the constitution as shown in FIGS. 2 and 3 also, an electroconductive oxide film 12 is held between a substrate 11 and an insulating oxide film 13. Such indentation, like this embodiment, makes it easy to position a probe electrode as desired in writing, partial writing, readout, partial readout, erasing, partial erasing, and so forth. Such indentation has a spacing of the projected portions (shown by a symbol "W" in FIG. 3) preferably in the range of from 1 μm to 4000Å, and a height of the projection (shown by s symbol "T" in FIG. 3) is preferably in the range of from 3 μm to 2000Å. Such indentation is not necessarily formed on the entire recording face like the present embodiment, but may be formed locally ss desired.

Incidentally, in a particularly preferred embodiment of the present invention, the recording medium desirably has a surface smoothness of the insulating oxide film in the range of from 5 to 20Å, preferably from 20 to 50Å, where the term "smoothness" denotes a parameter for representing surface smoothness, meaning the difference of the maximum and the minimum of the projections or the recesses on the surface.

The methods of recording, readout (reproduction of record), and erasing of record of the present invention are described below in detail.

In the recording method of the present invention, the application of the voltage to the recording medium is conducted, for example, by applying a desired intensity of voltage, by use of a probe electrode held in proximity to the recording medium, between the probe electrode and the recording medium.

In the recording method of the present invention, not only two-valued recording and multivalued recording but also analog recording is feasible. The multivalued recording and the analog recording can be conducted by controlling intensity of the applied voltage or varying the number of applications of a voltage which may be constant in accordance with the information signal on application of the voltage to the recording medium.

The voltage to be applied to the medium on recording depends also on the kind and the combination of the aforementioned electroconductive oxide material and the insulating oxide material constituting the recording medium, and therefore is to be selected suitably corresponding to the materials. According to the knowledge of the inventor of the present invention, in the recording medium having the constitution like that of the present invention, the voltage is preferably not less than 2 volts, more preferably in the range of from 4 to 6 volts, in order to make sufficient the difference (or contrast) of oxygen ion quantity or the difference (or contrast) of electric resistance between recorded portions and non-recorded portions, to make recording in high density, high capacity, and high sharpness, and to attain satisfactory storability of the recorded matter. Still more preferably, the voltage is in the range of 5.0 to 5.5 volts.

The method of readout of the information recorded on a recording medium according to the method mentioned above is described below. The readout is conducted by application of a voltage with a probe electrode held in proximity to the recording medium similarly as in the recording. The readout may be conducted by scanning with keeping the distance between the probe electrode and the recording medium and detecting the current flowing at each portion (each of recorded portions and non-recorded portions). Otherwise, the readout may be conducted by scanning with varying the distance between the probe electrode and the recording face so as to keep the current constant, and detecting the variation of the distance. Either of the above methods is acceptable. The voltage to be applied to the medium for readout is preferably in the range of from 1 to 3 volts, since the difference of resistance between recorded portions and non-recorded portions is particularly great in this range of applied voltage. Still more preferably the voltage is in the range of 2.0 to 2.5 volts. The applied voltage on readout is preferably lower than that on recording for the same recording medium in the present invention.

In the Feedout method of the present invention, as mentioned above, the electroconductive materials employed in the recording medium exhibit a continuous change in physical or electric quantities in correspondence with the oxygen deficiency, which enables the readout of the multivalued or analog information recorded on a recording medium by detecting the continuous change.

The information recorded by the method of the present invention Can be erased by heating the entire face of the oxide layer. However, the major feature in erasing of the present invention is the feasibility of erasing the information in a similar manner as in recording and readout, particularly by applying a reversed bias voltage relative to the voltage applied on the recording thereof. Thus partial erasing or partial rewriting, which cannot be conducted by entire heating, can be conducted with the same apparatus.

The probe electrode to be used for the aforementioned recording, readout, and erasing needs to have a tip as sharp as possible in order to obtain higher resolution. In Examples shown later in this invention, the probe electrode used was made of a platinum wire of 1 mm diameter, the tip of which was ground mechanically into a 90° cone shape and was subjected to electric field application in ultra-high vacuum to evaporate surface atoms. However, the shape or the treatment method of the probe electrode is not limited thereto.

The distance between the probe electrode and the recording medium is preferably in the range of from 2Å and to 100Å, particularly preferably from 2Å to 20Å for detecting the tunnel current precisely, but not particularly limited thereto.

Figure 4:
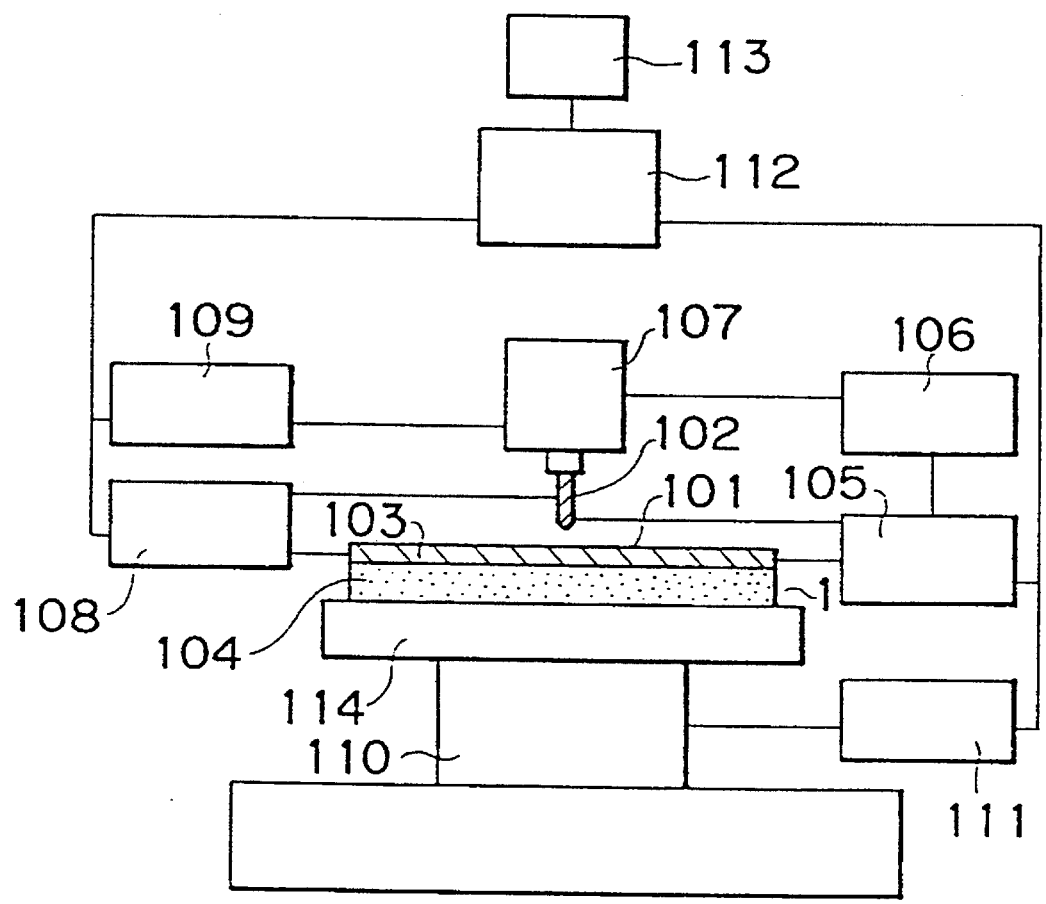
FIG. 4 illustrates roughly the constitution of the recording method and record-readout method of the present invention.

FIG. 4 is a block diagram illustrating an example of the apparatus used for recording, reproducing, and erasing of the present invention. In FIG. 4, the numeral 105 denotes a probe current amplifier. The numeral 106 denotes a servo circuit for controlling a fine control mechanism 107 employing a piezoelectric element to keep the probe current constant. The power source 108 applies pulse voltage between a probe electrode 102 and a substrate electrode 103 for recording and erasing.

Since the probe current changes abruptly on application of the pulse voltage, the servo circuit 106 controls a hold circuit to be turned on during that time.

An X-Y scanning drive circuit 109 moves and controls the probe electrode 102 in X-Y directions. Devices 110 and 111 serve for coarse control of the distance between the probe electrode 102 and the recording medium 1 so as to obtain a probe current of about $10^{-9}$ in advance, and for larger displacement of the probe electrode 102 relative to the substrate 104 in X-Y directions (outside the control range of fine control mechanism). All of these devices are under central control by a microcomputer 112. The numeral 113 denotes a display device.

Examples of mechanical performances in movement control by use of a piezoelectric element are shown below.

Fine control range in Z direction: 0.1 nm to 1 μm

Coarse control range in Z direction: 10 nm to 10 mm

Scanning range in X,Y directions: 0.1 nm to 1 μm

Coarse control range in X,Y directions: 0.1 nm to 1 nm

Allowable error for measurement and control: <0.1 nm (in fine control)

Allowable error in measurement and control <1 nm (in coarse control)

The present invention will be described below more specifically.

EXAMPLE 1

A recording-reproducing apparatus shown in FIG. 4 was employed. A probe electrode made of platinum was employed as probe electrode 102. The probe electrode 102 is controlled finely by an piezoelectric element to keep the distance (Z) from insulating oxide film 101 so as to maintain the electric current constant. Further, fine controlling mechanism 107 is designed to be capable of controlling finely the movement in X-Y directions in the plane with the distance Z kept constant. All of those are known prior art. The probe electrode 102 may also be used for direct recording, reproduction, and erasing. The recording medium, which is placed on XY stage 114 of high precision, may be moved to any desired position.

An experiment is described in detail in which the recording medium employed is constituted of a counter electrode formed from $YBa_2Cu_3O_{7-\delta}$ as the electroconductive oxide material, and the insulating oxide film 10 formed from $SiO_2$ for pinning oxygen ions.

Electroconductive $YBa_2Cu_3O_{7-\delta}$ film 103 was formed on an MgO single crystal substrate plate 104 by sputtering. Further, on the surface thereof, $SiO_2$ insulating oxide film 101 was formed by sputtering, thus preparing a recording medium.

Figure 5:
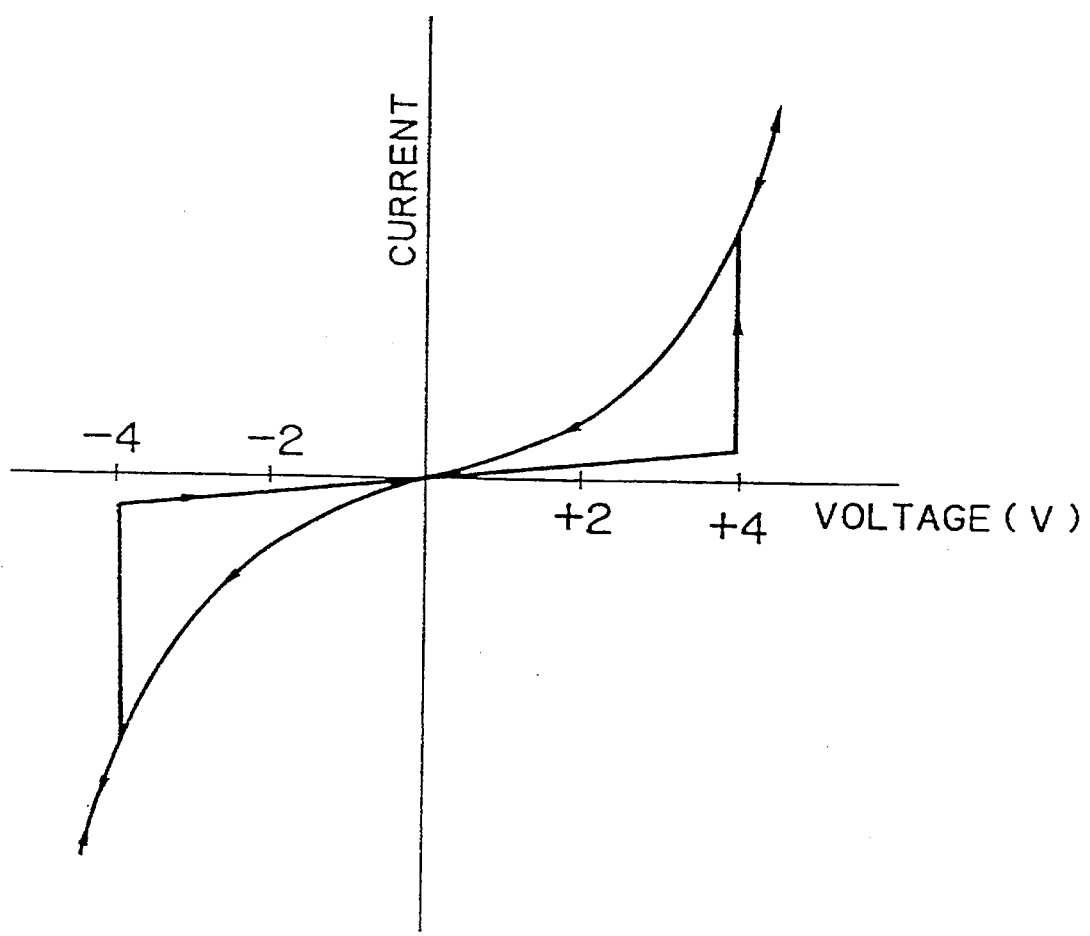
FIG. 5 is a characteristic V (voltage)-I (electric current) relation for explaining the recording characteristics (electric characteristics) of the recording medium of the present invention.

This recording medium 1 was fixed on an XY stage 114. With the output of XY scanning drive circuit 109 being held, the probe electrode 102 was fixed at a certain position. Then variable voltage was applied thereto in rectangle pulse from pulse power source 108 to measure the V-I characteristics, thereby a V-I curve as shown in FIG. 5 being obtained. From this result, it was found that application of about 4 volts or lower gives memory of a high resistance state, and application of voltage of about 4 volts or higher gives memory of a low resistance state. Thus two-valued recording of a high resistance state and a low resistance state could be made by application of a voltage higher than a threshold voltage.

An experiment of recording, reproduction and erasing is describe in detail below by using this recording medium 1.

The recording medium 1 is placed on the XY stage 114. A voltage of 1.0 volt was applied between the electroconductive oxide film 103 and the probe electrode 102. The distance Z between the probe electrode 102 and the surface of the insulating oxide film 101 was adjusted by monitoring the electric current. Thereafter the fine control mechanism 107 was controlled to keep the probe current Ip to be at $10^{-9}$ A. The probe current Ip for controlling the distance between the probe electrode 102 and the surface of the insulating oxide film 101 should be adjusted to be within the range of $10^{-7}A \geq Ip \geq 10^{-12}A$, preferably $10^{-8}A \geq Ip \geq 10^{-10}A$. While the XY stage 114 was moved stepwise at a constant interval of 1 μm, a rectangular pulse voltage of higher than the threshold voltage of 4 volts (20 Vmax, 0.1 μs) to produce a low resistance state. Thereafter, the change of current intensity at the low resistance state region and the high resistance state region can be read out directly by applying a probe voltage of 1.0 volt between the probe electrode 102 and the electroconductive oxide film 103, or otherwise can be read through the servo circuit 106.

In this example, the probe current flowing at the high resistance state was confirmed to be about 10 times as large as that before recording (or the low resistance state).

Further, the recording apparatus was again made to trace while a rectangular voltage of the negative threshold voltage of −4 volts or more was applied to the probe electrode. Consequently, all the recorded state was confirmed to have been erased and changed to a high resistance state.

EXAMPLE 2

The constitution of the recording medium employed in Example 1 was changed to comprise an electroconductive oxide of ITO prepared by vacuum vapor deposition, and an insulating oxide of $TiO_2$. The threshold voltage thereof was about 2 volts. An experiment was conducted in the same manner as in Example 1, and found that recording and readout are feasible with a sufficient S/N ratio.

EXAMPLE 3

The constitution of the recording medium employed in Example 1 was changed to comprise an electroconductive oxide of $Bi_2Sr_2Ca_1Cu_2O_x$ prepared by sputtering, and an insulating oxide of MgO prepared thereon by sputtering. An experiment was conducted in the same manner as in Example 1, and found that recording and readout are feasible with a threshold voltage of about 4.5 volts.

EXAMPLE 4

The constitution of the recording medium employed in Example 1 was changed to comprise an electroconductive oxide of $YBa_2Cu_3O_{7-\delta}$ prepared by sputtering, and an insulating oxide of $SiO_2$ prepared thereon by sputtering, and to have pits prepared by conventional lithography as shown in FIG. 3 (pit spacing of 0.5 µm). This article used as a recording medium had a threshold value of about 4 volts. An experiment was conducted in the same manner as in Example 1, and found that recording and readout are feasible with an S/N ratio larger than that in Example 1.

EXAMPLE 5

The constitution of the recording medium employed in Example 1 was changed to comprise an electroconductive oxide of $YBa_3Cu_6O_y$ prepared by sputtering, and an insulating oxide of $SrTiO_3$ prepared thereon by sputtering. An experiment was conducted in the same manner as, in Example 1, and found that recording and readout are feasible with a threshold voltage of about 5.0 volts.

In the Examples described above, the material used for the recording medium is any electroconductive oxide material which changes its electrical state according to oxygen deficiency; and the insulating oxide material need not be completely insulative but should have electroconductivity of one or more decimals lower than that of the electroconductive oxide material, or in other words, being lower by one or more orders of magnitude over that. Any of such oxide materials may be applied to the present invention.

The recording medium of the present invention has advantages as below:

(1) Much higher density of recording is feasible with a large capacity in comparison with magnetic recording and optical recording.

(2) The employed recording system utilizing the oxygen ion movement gives recording mediums superior resistance to a magnetic field, a temperature change, and other environmental changes, and satisfactory storability of recorded matter, and further gives superior controllability of the medium in two-valued recording and multivalued recording by voltage application with high reproducibility.

(3) The achievable small thickness of the recording layer gives inexpensive recording mediums with high productivity.

(4) The energy for reproduction is small, and the consumption of electric power is small.

(5) All of the operations of recording, readout (or reproduction), and rewriting (or erasing) are feasible directly with electric signals arbitrarily within the same apparatus.

What is claimed is:

1. A recording medium, comprising:

a substrate;

an insulating oxide film; and an electroconductive oxide film held between said substrate and said insulating oxide film, wherein said electroconductive oxide film is capable of causing oxygen to migrate or diffuse therein through the application of a voltage thereto, and said insulating oxide film prevents migration or diffusion of the oxygen to the outside of said electroconductive oxide film, and accordingly has a thickness of 0.1 µm or less.

2. The recording medium of claim 1, wherein said insulating oxide film comprises a substance having electroconductivity of not higher than $10^{-4}\Omega^{-1}cm^{-1}$.

3. The recording medium of claim 1, wherein said insulating oxide film comprises a substance having an electroconductivity being lower by one or more orders of magnitude over said electroconductive oxide film.

4. The recording medium of claim 1, wherein said insulating oxide film has a thickness of not more than 1000Å.

5. The recording medium of claim 1, wherein said insulating oxide film has a uniformly smooth surface.

6. The recording medium of claim 1, wherein said electroconductive oxide film comprises a substance having an electroconductivity varying in correspondence with oxygen deficiency.

7. The recording medium of claim 1, wherein said electroconductive oxide film has a thickness within the range of from 1000Å to 10000Å.

8. The recording medium of claim 1, wherein said insulating oxide film comprises a material selected from the group consisting of $SiO_2$, $TiO_2$, MgO, $SrTiO_3$, BaO, $Y_2O_3$, $BaTiO_3$, and ZnO.

9. The recording medium of claim 1, wherein said electroconductive oxide film comprises a material selected from the group consisting of ITO, $IrO_2$, $WO_3$, $CaWO_4$, $InO_2$, and $MnO_2$.

10. A recording medium, comprising:

a substrate;

an insulating oxide film; and an electroconductive oxide film held between said substrate and said insulating oxide film, wherein said electroconductive oxide film comprises a material represented by a general formula selected from the group consisting of [I] to [IV]:

[I] $Y_1Ba_{x1}Cu_{y1}O_{z1}$
where $2 \leq x_1 \leq 4$, $3 \geq y_1 \geq 8$, and $z_1 > 0$

[II] $Bi_2Sr_2Ca_{x2}Cu_{y2}O_{z2}$
where $0 \leq x_2 \leq 2$, $1 \leq y_2 \leq 3$, and $z_2 > 0$

[III] $Tl_1Ba_2Ca_{x3}Cu_{y3}O_{z3}$
where $0 \leq x_3 \leq 5$, $1 \leq y_3 \leq 6$, and $z_3 > 0$

[IV] $Tl_2Ba_2Ca_{x4}Cu_{y4}O_{z4}$
where $0 \leq x_4 \leq 5$, $1 \leq y_4 \leq 6$, and $z_4 > 0$.

11. A recording medium of claim 10, wherein said insulating oxide film comprises an oxygen-intercepting substance.

12. A recording medium of claim 10, wherein said insulating oxide film comprises a substrate having electroconductivity of not higher than $10^{-4}\Omega^{-1}cm^{-1}$.

13. A recording medium of claim 10, wherein said insulating oxide film comprises a substance having an electroconductivity being lower by one or more orders of magnitude over said electroconductive oxide film.

14. A recording medium of claim 10, wherein said insulating oxide film has a thickness of not more than 1000Å.

15. A recording medium of claim 10, wherein said insulating oxide film has a uniformly smooth surface.

16. A recording medium of claim 10, wherein said electroconductive oxide film comprises a substrate having an electroconductivity varying in correspondence with oxygen deficiency.

17. A recording medium of claim 10, wherein said electroconductive oxide film has a thickness within the range of from 1,000Å to 10,000Å.

18. A recording medium of claim 10, wherein said insulating oxide film comprises a material selected from the group consisting of $SiO_2$, $TiO_2$, MgO, $SrTiO_3$, BaO, $Y_2O_3$, $BaTiO_3$, and ZnO.

19. A recording medium of claim 10, wherein said electroconductive oxide film comprises a material selected from the group consisting of ITO, $IrO_2$, $WO_3$, $CaWO_4$, $InO_2$, and $MnO_2$.

* * * * *

UNITED STATES PATENT AND TRADEMARK OFFICE
CERTIFICATE OF CORRECTION

PATENT NO. : 5,481,491

DATED : January 2, 1996

INVENTOR(S) : Yamamoto et al.

It is certified that error appears in the above-indentified patent and that said Letters Patent is hereby corrected as shown below:

On the title page
[56] REFERENCES CITED:

OTHER PUBLICATIONS, "Helvetical" should read --Helvetica--.

COLUMN 1:

Line 51, "[G. Binning" should read --[G. Binnig--.

COLUMN 2:

Line 23, "U. Staler" should read --U. Stafer--.

COLUMN 3:

Line 54, "ions" should read --ion--.

COLUMN 5:

Line 10, "$Bi_2Sr_2Cu_3O_y$," should read --$Bi_2Sr_2Cu_1O_y$,--.
Line 31, "$(\Omega.cm)^{-1}$" should read --$(\Omega.cm)^{-1}$,--.
Line 45, "insulting" should read --insulating--.
Line 63, "s" should read --a--.
Line 67, "ss" should read --as--.

COLUMN 7:

Line 1, "Feedout" should read --readout--.
Line 48, "$10^{-9}$" should read --$10^{-9}$ A--.

COLUMN 8:

Line 18, "10" should read --is--.
Line 20, "$YBa_2Cu_3O_{7-\delta}$" should read --$YBa_2Cu_3O_{7-\delta}$--.

UNITED STATES PATENT AND TRADEMARK OFFICE
CERTIFICATE OF CORRECTION

PATENT NO. : 5,481,491

DATED : January 2, 1996

INVENTOR(S) : Yamamoto et al.

It is certified that error appears in the above-indentified patent and that said Letters Patent is hereby corrected as shown below:

COLUMN 10:

Line 54, "$2 \leq x_1 \geq 4$, $3 \geq y_1 \geq 8$," should read --$2 \leq x_1 \leq 4$, $3 \leq y_1 \leq 8$,--.
Line 56, "$1 \leq_2 2 \leq 3$," should read --$1 \leq y_2 \leq 3$,--.

Signed and Sealed this

Second Day of July, 1996

Attest:

BRUCE LEHMAN

*Attesting Officer*  *Commissioner of Patents and Trademarks*